Jan. 30, 1923.

K. NOBUHARA.
ROTARY ELECTRIC MACHINE.
FILED APR. 13, 1918.

Inventor:
Kantaro Nobuhara
by
M. C. Massie
his Atty

Jan. 30, 1923. 1,443,644
K. NOBUHARA.
ROTARY ELECTRIC MACHINE.
FILED APR. 13, 1918.
4 SHEETS-SHEET 2
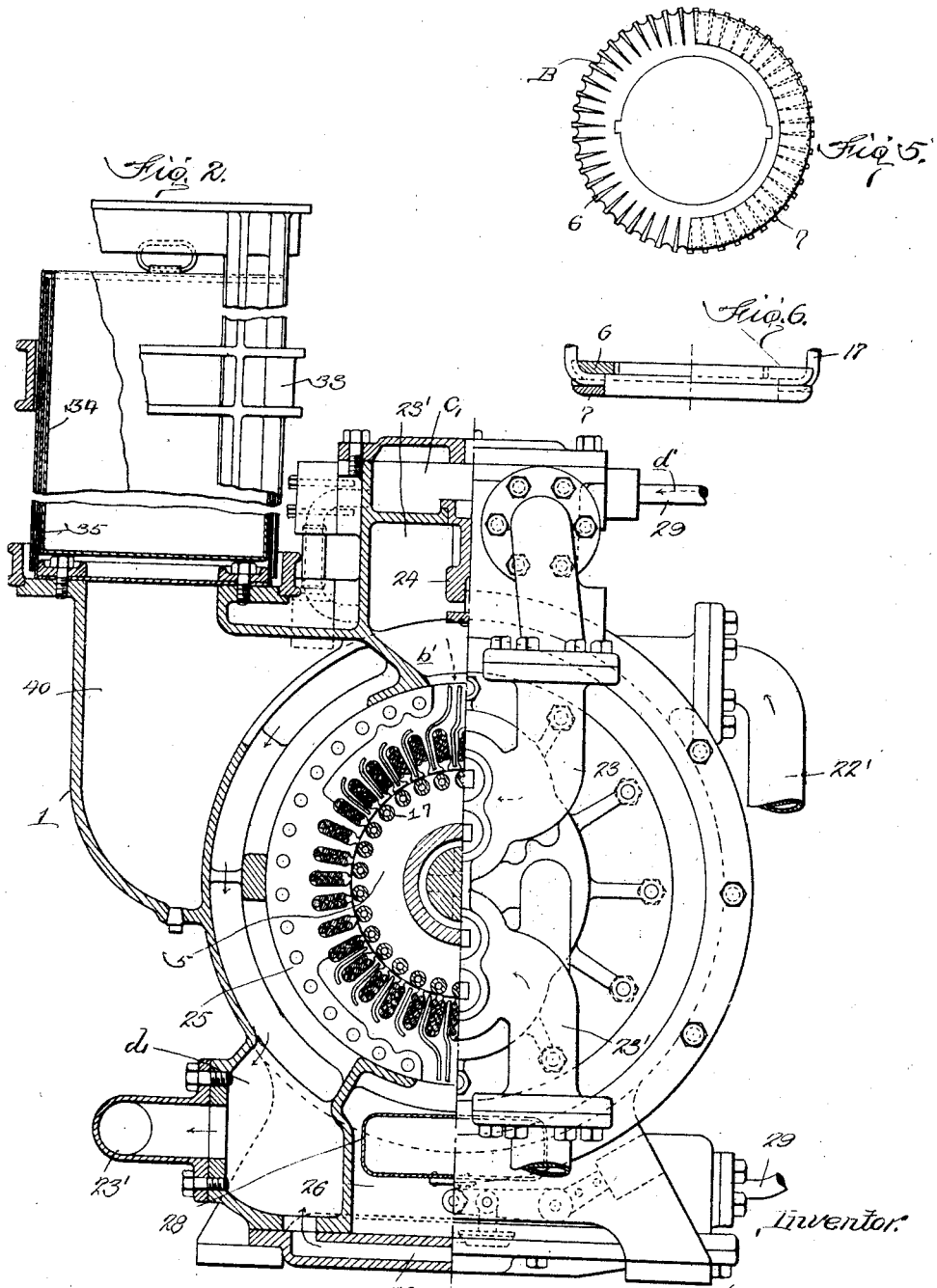

Jan. 30, 1923.

K. NOBUHARA.
ROTARY ELECTRIC MACHINE.
FILED APR. 13, 1918.

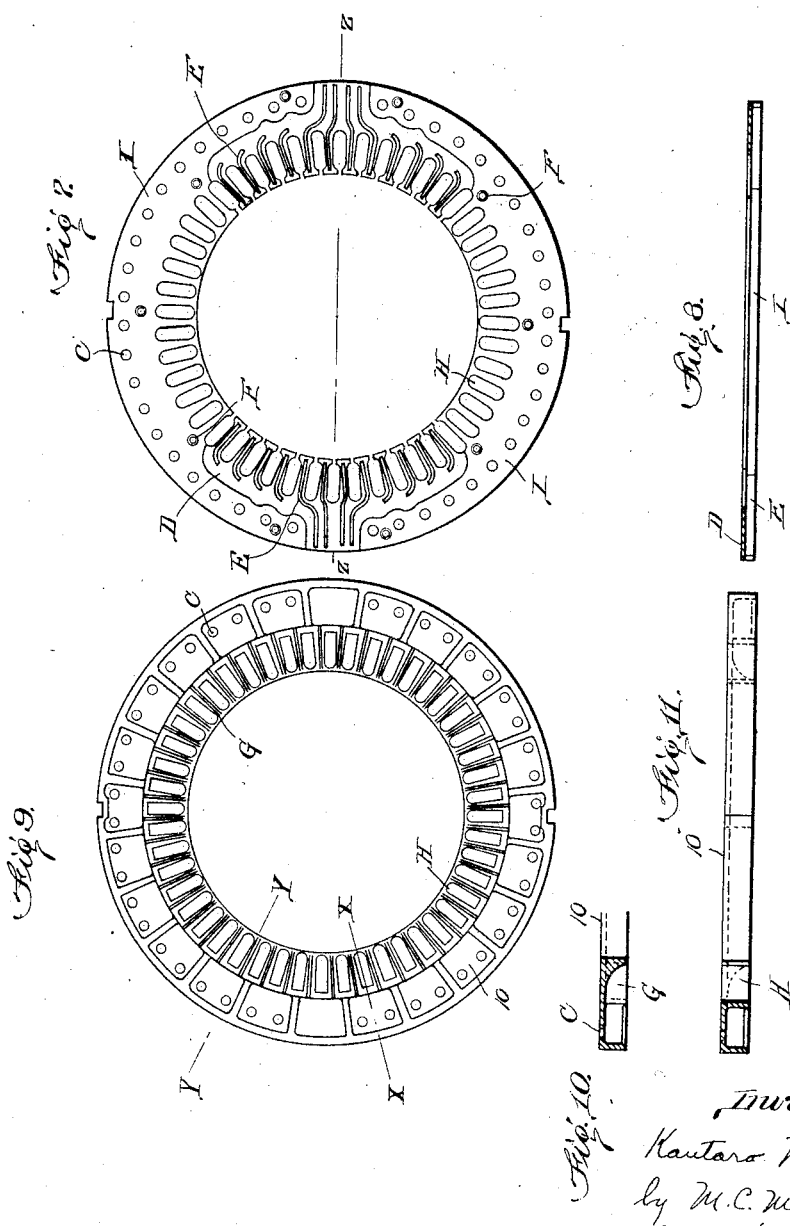

Patented Jan. 30, 1923.

1,443,644

UNITED STATES PATENT OFFICE.

KANTARO NOBUHARA, OF MUKO-GUN, HYOGO-KEN, JAPAN.

ROTARY ELECTRIC MACHINE.

Application filed April 13, 1918. Serial No. 228,451.

*To all whom it may concern:*

Be it known that KANTARO NOBUHARA, citizen of Japan, residing at No. 2055 Miyano-ushiro, Nishinomiya-cho, Muko-gun, Hyogo-Ken, Japan, has invented certain new and useful Improvements in Rotary Electric Machines; and he does hereby declare the following to be a full, clear, and exact description of the invention, such as will enable others skilled in the art to which it appertains to make and use the same.

This invention relates to cooling means for electric machines such as dynamos, motors, rotary converters and the like, in which a stator and a rotor are enclosed in an oiltight casing full of a cooling liquid, and a gas is introduced into the clearance space between the stator and the rotor to prevent the cooling liquid from entering into them.

The invention has for its object to provide a machine of the above mentioned type which shall be effectively cooled and perfectly insulated, and from the parts of which any corrosive or explosive gases contained in the atmosphere are excluded.

It is well known that if machine parts are immersed in oil, the heat produced in the parts will be absorbed by the oil. However, oil passing through the clearance spaces between a rotor and a stator produces friction that causes great loss of mechanical energy. In the present invention a gas is introduced into the said clearance spaces to exclude the cooling medium, that it to say, prevents the admission of the oil, which is in such a machine the main source of friction.

The accompanying drawings show an embodiment of the invention as applied to an induction motor, but it will be understood that the principles of the invention are equally applicable to other electric machines having cooperating stationary and moving elements.

Fig. 2 is an end view of the same, the half thereof on the left side being a section on the center line of Fig. 1;

Fig. 5 shows a plan of a rotor end ring, a half of its outer ring on the left side being removed;

Fig. 6 shows a partial, sectional elevation of the end ring and hollow conductors, which are placed in the end ring on their ends;

Fig. 7 shows a plan view of a duct piece;

Fig. 8 is its sectional side elevation on line $z$—$z$ in Fig. 7;

Fig. 9 is a plan view of a stator end ring;

Figs. 10 and 11 are sectional views on lines $y$—$y$ and $x$—$x$, respectively, of Fig. 9.

Figure 1:
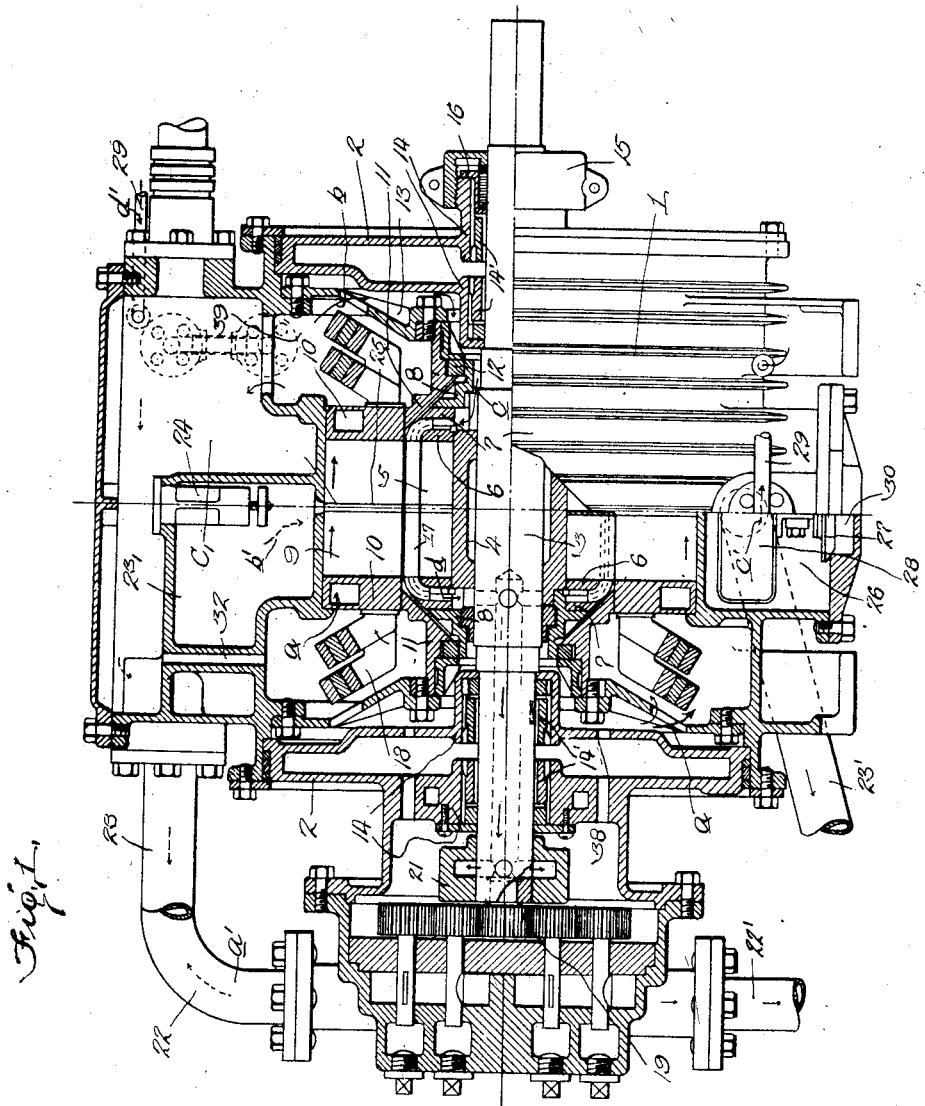
Fig. 1 is a sectional view of the machine, its lower half on the right side being left in side elevation.

In the drawings, 1 is a casing, both sides of which are closed with the covers 2. 3 is a rotor shaft, a half of which at the left end is made hollow as shown in Fig. 1. 4 is the hub of the rotor core 5 which is firmly fixed on the said hub with end rings 6 and 7 and screw rings 8. As shown in Fig. 1, the hub 4 has threaded portions on its extreme ends, and the screw rings or nuts 8 are fitted on the said threaded portions, and by this means the end rings 6 and 7 are pressed towards the core 5, which, in turn, is firmly pressed down. 9 is a stator core firmly fixed to the casing with its end rings 10. A large circular ring or cylinder 11 is placed on each side of the rotor. One end thereof is fitted oil-tight to the stator end ring 10, and the other end is supported and pressed inward by a ring holder 13, which is bolted to the casing 1. 12 designates packing rings which, being placed in annular recesses in the circular rings 11, prevent oil or gas from leaking into the contacting parts of the nuts 8 with the rings 11. The bearings 14 also carry bearing brasses 14′, a stuffing box 15, and a packing gland 16.

Numerous hollow conductors 17 are distributed on the periphery of the rotor core, and are located in the perforated holes or ducts in the latter. Both ends of these hollow conductors, as shown in the Fig. 1, are bent inward and firmly held in place by the end rings, which consist of an inner ring 6 and an outer ring 7. The rings 6 and 7 have many radial grooves B on their adjacent surfaces, and into these grooves the ends of the said hollow conductors 17 are tightly inserted, as best shown in Figs. 5 and 6. The stator core 9 is perforated in the same manner as its end rings 10 as shown in Fig. 9, and the conductors 18 thereon are held in the holes or ducts H. The air gaps G are arranged alternately with the ducts H in order to prevent the inducement of eddy currents in the end rings 10. Holes C are arranged in the end rings 10 and the stator core 9.

At an end of the rotor shaft 3 a gear 19 is arranged for driving two Root pumps, one of which is for gas and the other for oil. On the outside of the left side of the bearing 14, in Fig. 1, an annular case 21, which will be called an oil collector hereinafter, is bolted to the pump casing and an end of the shaft revolves in the said collector. The oil collector 21 has a passage endwise, by which the collector communicates with the suction pipe of the oil pump.

Figure 4:
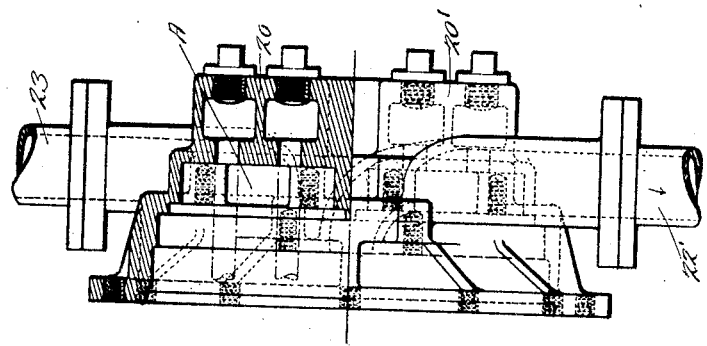
Fig. 4 is a side elevation of the pump casing, the half thereof on the right side being a section on the center line of Fig. 3.
Figure 3:
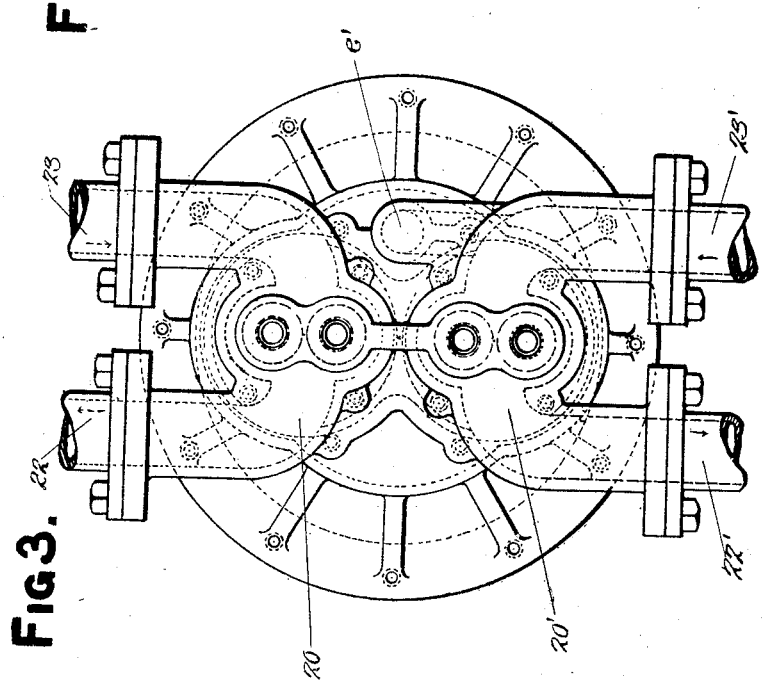
Fig. 3 is a front view of the pump casing.

In Figs. 3 and 4, 20 is the gas pump, 22 and 23 are its delivery and suction pipes, respectively, while the dotted arrows show the direction of the flow of gas. 20' is the oil pump, 22', 23' and the full lined arrows correspond to 22, 23, and the dotted arrows above mentioned. $e'$ is a branch passage of 23' and is connected with the endwise passage of the oil collector. A is a recess in the pump casing, in which a pair of pump vanes are arranged. The delivery pipe 22 of the gas pump opens into a chamber $23_1$ in the casing, while the suction pipe 23 opens into a chamber $C_1$ which will be called a top chamber hereinafter.

The core of the stator is made of sheet iron as is common, but the duct piece has a special characteristic. In Figs. 7 and 8, D is a sheet iron member to which two irregular plates I are secured with rivets F. When this built-up piece is placed in the core, two narrow segmental spaces are formed on the opposite sides, and it is so placed in the core that one of the spaces communicates with the chamber $23_1$ and the other with the chamber 26, which will be called a float chamber hereinafter. In these two narrow spaces a number of curved strips E are welded vertically to the member D, thereby dividing the space at various points in the passages. This is shown more clearly in Figs. 2, 7 and 8.

A valve 27 with a float 28 is arranged in the float chamber 26. The float 28 is hinged to a point of the casing, and is balanced with a weight which is shown by the dotted lines in Fig. 2. The float and the weight are enclosed in the float chamber. The valve 27 is lifted up when the float rises, the former being disposed directly under the latter. A pipe 29 is connected to this chamber and extends to the top chamber $C_1$. Adequate provision is made in this pipe to resist the flow of gas in it. 30 is a passage under the valve 27 and connects the float chamber with an adjacent chamber $d_1$ in which the suction pipe of the oil pump opens.

Th delivery pipe 22' of the oil pump connects with a chamber 38 in the left side cover 2, and the chamber 38 communicates with a chamber 39 in the right side cover by means of numerous holes C in the stator core. The chamber 39, in its turn communicates with the top chamber $C_1$ and the chamber $d_1$ in the manner as shown in Figs. 1 and 2.

The pipe 32 connects the chamber 38 with the top chamber $C_1$, and allows gas, which may be pocketed at the top of the chamber 38, to escape into the top chamber.

At the top of the machine an oil level controlling device is provided. It consists of an external guide casing 33, a float 34, and its guide wall 35. The float has a folded flange, and can be raised or lowered along the guide wall which projects between the side wall and the flange. The bottom end of the guide wall 35 is closely fitted to the external guide casing 33, so that gas that has come under the float can get into the external casing by passing through the clearance on both sides of the guide. The space 40 under the float 34 communicates with the chambers 39 and $C_1$, and the height of the communicating points of these chambers is slightly greater than the top of the stator core 9.

It will now be seen that there are two different passages in this machine, one for oil and the other for gas. The gas driven by the gas pump passes into the chamber $23_1$ and then enters the top space in the duct 25. Since the clearance space between the cores of the stator and the rotor communicates with the spaces in the duct piece, the gas passes into the clearance and proceeds into the lower space in the said duct piece, float chamber 26, pipe 29 and the top chamber $C_1$ in succession. The arrows $a'$, $b'$, $c'$, and $d'$ indicate the direction of flow of the gas.

The oil that is pumped into the delivery pipe 22' flows through the chamber 38, numerous holes C in the stator core and the chamber 39 successively, whereby the oil entirely absorbs the heat generated in the stator coils and the stator core. Most of the oil in the chamber 39 goes into the top chamber while, as indicated by the arrows $a$, $b$, $c$ and $d$, the remainder passes through the inner side of the screw rings 8 at the right, the hollow conductors of the rotor, the center hole of the shaft 3, and the oil collector 21, in succession. By this means the generated heat in the rotor core will be absorbed by the oil as it passes through the hollow conductors.

As already described, the top chamber $C_1$ is open to both the oil and gas sides of the cooling system, the suction pipe of the gas pump opens into the chamber $C_1$. The delivery pressure of the gas pump is higher than that of the oil side. Their difference is equal to the pressure drop in the pipe 29. The gas pressure in the duct piece 25, that in the clearness between the rotor and the stator, and that in the float chamber 26, are of course higher than the oil pressure in the adjacent chambers 38 and 39 and therefore, the oil can not leak into the gas side while the pumps are working. When the machine is at rest and the pumps stopped, the oil may leak into the gas side through the clearances and fill the float chamber 26. When the oil level in the float chamber reaches a certain height, the float is buoyed up and in consequence of this the valve 27 is opened to let the chamber 26 communicate with the chamber $d_1$ in which the suction pipe of the oil pump opens. For this reason, when the machine starts, the oil deposited in the float chamber is sucked up by the oil pump to be replaced at once by the gas delivered by the gas pump.

A safety valve 24 is provided on the wall of the chamber $23_1$. Should the pipe become choked and cause an abnormal rise of the gas pressure, the safety valve opens and lets the high pressure chamber $23_1$ communicate with the low pressure chamber $C_1$. The pressures are thus balanced and an accident is prevented.

The oil is cooled by suitable cooling apparatus, and the gas is also cooled by the cooled oil in the top chamber. The machine parts are thus very effectually cooled. The level of the cooling oil is always maintained to cover the stator core, the spaces above the oil level being occupied by the gas. The sealed gas to be used may be air, nitrogen, carbon-dioxide, or the like, but it must on no account be such as will give a chemical change to the oil or cause an explosion.

If the oil evaporates on account of the rise of temperature in the machine parts, the evaporated gas will gather in the top chamber $C_1$ and mix with the sealed gas. The pressure in the chamber then increases and the oil level will be lowered. The oil level in the chamber 40 then rises and the float 34 buoys up, the float rising or falling in accordance with the fluctuation of the oil level in the top chamber. When the evaporation of the oil is very rapid, the oil level in the top chamber will fall so that the gas in said chamber finds its way to the chamber 40 through their communicating points, the height of which is greater than the top of the stator core as already explained. The gas in the chamber 40 will ascend and escape into the open air through the clearance on the sides of the guide wall 35. This causes the oil level in the casing again to rise to always keep the working parts in the cooling oil. If desired, the oil level controlling device may be replaced by a safety valve of any suitable known type and may be located at the top of the casing.

The machine can be worked with safety either in water or in an explosive gas if the cock is closed.

What I claim is:

1. An electric machine comprising a stationary part, a part movable relatively thereto and separated therefrom by a clearance space, means adapted and arranged to maintain a suitable fluid in contact with said parts to cool the same, and means for resisting flow of such cooling fluid into said clearance space.

2. An electric machine comprising a stator, a rotor cooperating therewith and separated therefrom by a clearance space, means comprising a casing for said stator and rotor adapted and arranged to maintain a suitable cooling fluid in contact with said stator and rotor for absorbing the heat generated by the same while they are operating, and means for resisting the admission of cooling fluid into said clearance space.

3. An electric machine comprising a stationary part, a part movable relatively thereto and separated therefrom by a clearance space, means adapted and arranged to maintain a suitable fluid under pressure and in contact with said parts to cool the same, and means for supplying a gas to said clearance space under higher pressure than said cooling fluid to prevent the admission of such fluid to said clearance space.

4. A rotary electric machine comprising the combination of a stator member, a rotor member cooperating therewith and separated therefrom by a clearance space, means substantially sealing said clearance space, and means for maintaining a fluid pressure in said clearance space.

5. A rotary electric machine comprising the combination of an oil-tight casing within which the working parts are enclosed, means arranged to maintain a suitable fluid at a point above the said working parts, and means for introducing a gas into the clearance space between said parts in order to prevent the admission of said fluid into the said clearance space, for the purpose set forth.

6. An electric machine comprising in combination, a rotor, casing means enclosing said rotor including end cover members and a stator separated therefrom by a clearance, and means for introducing a gas into said clearance to prevent a liquid from entering said clearance while permitting contact of said liquid with the rotor and stator, substantially as set forth.

7. An electric machine comprising in combination a stator, a rotor cooperating therewith and separated therefrom by a clearance, means comprising a pump driven by said machine for supplying fluid to cool said stator and rotor, and means comprising a pump driven by said machine for supplying gas to said clearance to resist the admission of said cooling fluid to said clearance, for the purpose set forth.

8. An electric machine comprising in combination a stator and a rotor separated by a clearance and having cooling fluid passages therein, means for circulating a cooling fluid through such passages, and gas pressure means resisting the leakage of cooling fluid into such clearance and means to remove cooling fluid that leaks into the clearance.

9. An electric machine comprising in combination a stator and a rotor separated by a clearance, housing means therefor, a liquid pump for supplying cooling liquid to said housing to cool said stator and rotor, a gas pump for supplyng a gas to said clearance to resist the admission of liquid to said clearance, and means for maintaining the delivery pressure of the gas pump higher than that of the liquid pump, for the purpose set forth.

10. An electric machine comprising in combination a stator and a rotor separated by a clearance space, said stator having passages on opposite sides of said rotor communicating with one another through said clearance space, and a fluid pump having its delivery side connected to one of said passages and its suction side connected to the opposite passage.

11. An electric machine comprising the combination of a stator, a rotor cooperating therewith, and means for cooling said stator and rotor comprising a liquid pump, a gas pump, a chamber communicating with the suction side of the gas pump and adapted to communicate with the suction side of the liquid pump, a valve controlling the passage connecting said chamber to said liquid pump, and a float in said chamber controlling said valve.

12. An electric machine comprising the combination of a rotor provided with end rings comprising an outer ring and an inner ring, said rings each having radial ribs adapted to abut when the rings are assembled to form radial passages therebetween, said rotor having hollow conductors provided with parts fitting in said radial passages, a shaft supporting said rotor and provided with passage means communicating with said radial passages, and means for circulating cooling fluid through said shaft, passages and hollow conductors.

13. In combination, an electric machine having a housing or casing, and cooling means for said machine comprising means for maintaining a level of cooling liquid in said casing, such maintaining means comprising a float adapted to fluctuate with the rise and fall of the liquid level in said casing and a guide cooperating with said float and arranged to release gas from said casing when said float reaches a predetermined level.

14. A machine having rotary mechanism comprising a housing or casing within which the working parts are enclosed adapted to contain a fluid, a hollow shaft, a rotor carried by said shaft, said rotor being provided with passages therethrough and means for circulating a fluid in said housing or casing through said passages and through said hollow shaft.

15. A machine having rotary mechanism comprising a stator and a rotor separated by a clearance space, means for circulating a liquid through said stator and rotor and means for circulating a gas in said clearance space.

16. A machine having rotary mechanism comprising a stationary part, a part movable relatively thereto and separated therefrom by a clearance space, means for maintaining a liquid in contact with said parts to cool the same, means for resisting flow of such cooling liquid into said clearance space and means for removing any cooling liquid which may have leaked into said clearance space.

17. A machine having rotary mechanism comprising a casing adapted to contain a fluid, a stationary part, a part movable relatively thereto and separated by a clearance space, said stationary part and movable part adapted to be covered by a fluid and means for sealing said clearance space against admission of said fluid.

18. A machine having rotary mechanism comprising a casing within which the working parts are enclosed and adapted to contain a liquid, means arranged to maintain a suitable liquid at a point above said working parts, said working parts being separated by a clearance, means resisting admission of said liquid to said clearance space, one of said working parts provided with passages communicating with said clearance space and a fluid pump having its delivery side connected to one of said passages and its suction side connected to another of said passages.

In testimony whereof he hereunto affixes his signature.

KANTARO NOBUHARA.